United States Patent [19]

Komeda et al.

[11] 4,427,123
[45] Jan. 24, 1984

[54] STAINLESS STEEL THERMOS BOTTLE

[75] Inventors: Masakatsu Komeda, Kashihara; Mamoru Fujiyama, Nara, both of Japan

[73] Assignee: Zojirushi Vacuum Bottle Co., Ltd., Osaka, Japan

[21] Appl. No.: 322,928

[22] Filed: Nov. 19, 1981

[30] Foreign Application Priority Data

Nov. 20, 1980 [JP] Japan .................................. 55-167311

[51] Int. Cl.³ .................... A47J 41/02; B65D 25/14; B65D 81/38
[52] U.S. Cl. .................................. 215/13 R; 220/424; 220/456; 428/639; 428/671; 428/679
[58] Field of Search ................ 220/420, 421, 423, 424, 220/425, 434–456; 215/13 R; 204/40, 25; 428/678, 680, 681, 675, 673, 639, 679, 671

[56] References Cited

U.S. PATENT DOCUMENTS

| 957,809 | 5/1910 | Steel | 215/13 R |
|---|---|---|---|
| 1,199,772 | 10/1916 | Engel | 215/13 R |
| 1,221,335 | 4/1917 | Kline | 215/13 R |
| 1,551,778 | 9/1925 | Altenberg | 220/423 X |
| 1,566,221 | 12/1925 | Lindtmuth | 220/425 X |
| 2,348,549 | 5/1944 | Kraft | 220/456 X |
| 2,643,021 | 6/1953 | Freedman | 220/424 |
| 3,331,522 | 7/1967 | Bridges | 215/13 R |
| 3,355,268 | 11/1967 | Du Rose et al. | 428/678 X |

FOREIGN PATENT DOCUMENTS

| 942760 | 2/1949 | France | 215/13 R |
|---|---|---|---|
| 1012621 | 12/1965 | United Kingdom | 220/421 |

Primary Examiner—Allan N. Shoap
Attorney, Agent, or Firm—Stevens, Davis, Miller & Mosher

[57] ABSTRACT

A stainless steel thermos bottle comprising inner and outer bottles made of stainless steel, the inner and outer bottles being joined together at tip portions of their bottlenecks to form a double-walled construction, the space created between the two bottles being a vacuum. The surfaces of the inner and outer bottles that surround the space are provided with at least one metal deposit at least on an outer surface of the inner bottle, except for a part or all of the bottleneck surfaces in the space. The part or all of the bottleneck surfaces in the space includes the surface of the joint between the two bottles.

2 Claims, 2 Drawing Figures

STAINLESS STEEL THERMOS BOTTLE

BACKGROUND OF THE INVENTION

1. Field of the Invention

This invention relates to a thermos bottle and, more particularly, to a stainless steel thermos bottle with excellent thermal insulating properties.

2. Description of the Prior Art

Thermos bottles which are now widely used are usually made of glass and are of a double-walled construction, with a vacuum in the space between the two walls. Such glass thermos bottles have the advantages of high heat insulating properties, but are poor in resistance to mechanical shocks. Thus, if any mechanical shock is given, breakage of the bottles and effluence of their contents can result. As thermos bottles with high resistance to mechanical shocks there have recently been proposed metal thermos bottles, which are made of a suitable metal material such as stainless steel, some of which have been put into practical use. For example, there is a metal thermos bottle which is made of stainless steel and is of a vacuum insulated, double-walled construction. In order to decrease the heat transfer due to radiation the inner bottle is polished and a composite material is arranged in the vacuum space formed between inner and outer bottles. The composite material generally comprises one or more lustered thin steel or aluminium plates and glass wool layers. In an alternative form the vacuum space is packed with a large amount of a mixture comprising fine-grained powder of graphite, diatom earth and calcium oxide.

These metal thermos bottles have the advantages of high resistance to mechanical shocks, and their outer bottle per se can serves as an outer jacket. However, these metal thermos bottles are considerably inferior to the glass thermos bottles in thermal insulating properties, which are the most important properties of thermos bottles. This problem mainly depends on the physical properties of the metal used and the construction of the thermos bottle. Particularly, the metal material contains some gases such as hydrogen, so that the gas would be liberated from the interior of the metal into the vacuum space, with the result that the vacuum becomes progressively worse with time. Thus, it is difficult with such a metal thermos bottle to maintain the thermal insulating properties for a long time. In the prior art metal thermos bottles it has been attempted to prevent the lowering of the vacuum by use of a getter material with which the gas released from the metal into the vacuum space combines to form stable compounds. However, there is no prior art metal thermos bottle with thermal insulating properties which are as good as glass thermos bottles.

SUMMARY OF THE INVENTION

It is a principal object of the present invention to provide a metal thermos bottle which has high thermal insulating properties and keeps its heat retaining performance constant for a long period of time.

Another object of the present invention is to provide a metal thermos bottle which is of a compact and economic construction.

According to the present invention there is provided a stainless steel thermos bottle comprising inner and outer bottles made of stainless steel, the inner and outer bottles being joined together at tip portions of their bottlenecks to form a double-walled construction, the space formed between said inner and outer bottles being a vacuum, characterized in that the wall surfaces of the inner and outer bottles that surround the vacuum space are provided with at least one metal deposit, at least on an outer surface of the inner bottle, except for a part or all of the bottleneck surfaces in the space, which include the surface of the joint between said two bottles.

In a preferred embodiment, at least one metal deposit is formed on the whole of the wall surfaces that surround the vacuum space, i.e., the outer surface of the inner bottle and the inner surface of the outer bottle, except for a part or all of the bottleneck surfaces in the space.

The at least one metal deposit may consist of nickel. In a preferred form the nickel deposit includes at least two layers, i.e., a bright nickel layer and a semibright nickel layer. These nickel layers can be formed by electroplating and are of a fine-grained crystal structure. The semibright nickel layer can prevent the liberation or evolution of gases from the basis stainless steel into the vacuum space, whereas the bright nickel layer can prevent the heat transfer due to radiation which causes temperature lowering of the hot liquid in the bottle. When the nickel deposit is composed of two layers, semibright nickel layer is preferrably formed on the basis metal for the first layer, and then the bright nickel layer is formed thereon. Although these nickel layers are protected from errosion since they are positioned in the vacuum space of the bottle, a bright nickel layer with a high sulfer content (generally of 0.1 to 0.2%), which is referred to an a trinickel, may be placed between the two nickel layers to ensure that no errosion occurs. In a preferred form, an electroless nickel deposit is formed on the basis metal prior to the electroplating. This electroless plated nickel layer is almost free from pinholes and is characterized by a fine crystal size. The general effects of this layer are to prevent the liberation of gas from the basis metal and to improve the plate-adhesion to the stainless steel base. This electrolessly plated deposit is generally of not more than $20\infty$ thick, preferably, 10 to $20\mu$ thick. A deposit of less than $10\mu$ does not achieve its objects, while a deposit of more than $20\mu$ can lead to increased time required for plating, with the result being that production efficiency decreases.

The solution utilized for electroplating or electroless plating may be one which is generally used in the plating art field.

In a preferred embodiment, the metal deposits further comprise a copper or silver layer plated on the outermost nickel layer. This copper or silver layer is formed to prevent the liberation of gas released from the basis metal into the vacuum space through the nickel deposits and also the heat transfer due to the radiation, thereby improving the thermal insulating properties. The thickness of such a copper or silver deposit is 2 to $8\mu$, preferably 3 1 to $5\mu$. The 3 to $5\mu$ thickness is prefered because with a deposit of less than $2\mu$ it is difficult to obtain effective results, and because a deposit of more than $8\mu$ leads to increased manufacuring costs since its effects are saturated at about $8\mu$.

According to the present invention, the wall surfaces of the inner and outer bottles that surround the vacuum space have a metal deposit at least on the outer surface of the inner bottle, except for a part or all of the surfaces of the neck portions including the surface of the joint between the inner and outer bottles. That is, a part or all of the surfaces of the neck portions including the joint surface is never plated, and in some cases the inner surface of the outer bottle may not be plated. Thus, these surfaces would permit the liberation or evolution of the gas contained in the basis metal under the influence of the vacuum and the heat, with the result that the released gas would lower the vacuum in the space. The released gas, however, is very little since the surface area of the neck portions in the vacuum space is extremely small as compared with the outer surface of the inner bottle and the outer bottle is never directly subjected to a high temperature. Thus, the lowering of the vacuum can be prevented by use of a getter material such as barium, magnesium, calcium, sodium, etc.

The reason why a part or all of the surfaces of the neck portions in the vacuum space, i.e., a part or all of the outer surface of the neck of the inner bottle and a part or all of the inner surface of the neck of the outer bottle, are never plated is that nickel, copper and silver deposits formed on the entire surface area of the walls surrounding vacuum space promote the heat transfer due to conduction since they have higher conductivity as compared with stainless steel. In the thermos bottle the heat travels from the inner bottle to the outer bottle or vise versa, through the joint between them, so that it is necessary to prevent the heat transfer due to conduction as much as possible. If the deposit is formed on the entire surface area of the walls surrounding The vacuum space, the deposit of such metals increase the heat transfer due to conduction, and produces to little improvement in the heat insulating properties of the stainless steel thermos bottle as a whole.

BRIEF DESCRIPTION OF THE DRAWINGS

These and other objects, features and advantages of the present invention will be further apparant from the following description taken in conjunction with the several figures of the accompanying drawings which slow, by way of example only, one form of a stainless steel thermos bottle embodying the present invention.

In the drawings.

DETAILED DESCRIPTION OF THE INVENTION

Figure 1:
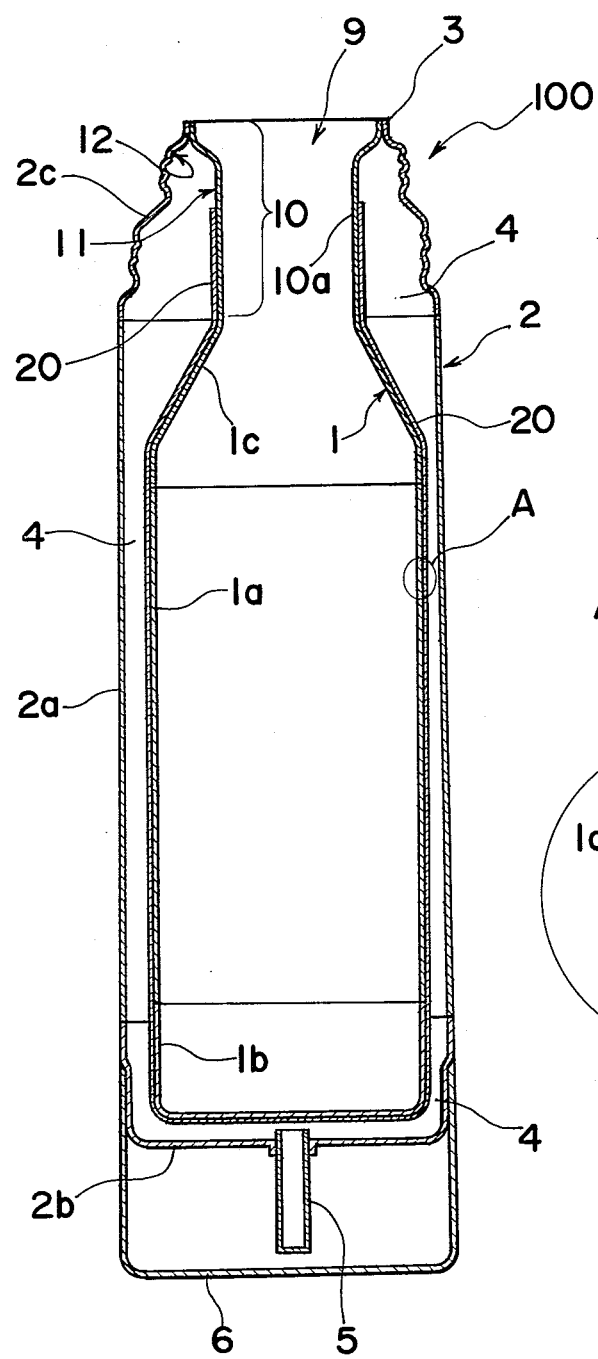
FIG. 1 is a sectional view of a stainless steel thermos bottle according to the present invention.

Referring to FIG. 1 there is shown a stainless steel thermos bottle 100 according to the present invention. The thermos bottle 100 comprises an inner bottle or vessel 1 and an outer bottle or housing 2, both of which are made of stainless steel. The inner bottle or vessel 1 has a substantially cylindrical shape with a narrow neck portion 10a which is open at its top to form a mouth 9 of the thermos bottle 100. This inner bottle 1 is enclosed within the outer bottle 2 having a substantially cylindrical shape and a greater diameter, and joined therewith at the tip 3 of the bottleneck 10 by a suitable joining means such as soldering or welding, to form a double-walled construction with the space between the two bottles being a vacuum. The bottom 2b of the outer bottle 2 is provided with a tip tube 5 through which air is withdrawn from the space 4 created between the inner and outer bottles 1 and 2. A bottom cap 6 is fixed on the bottom of the outer bottle 2 to protect the tip tube 5.

Figure 2:
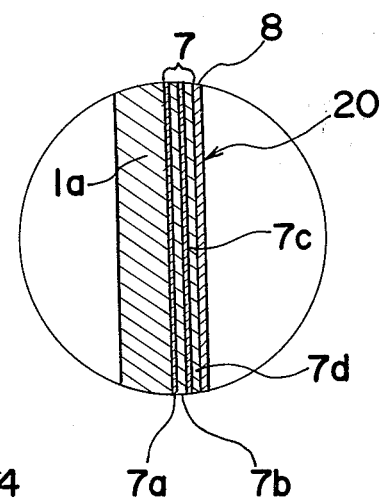
FIG. 2 is an enlarged sectional view of a part A in FIG. 1.

In order to improve the heat insulating properties, the thermos bottle, according to the present invention, is provided with at least one metal deposit 20 at least on the exterior surface of the inner bottle 1, except for a part or all of the surfaces 11, 12 of the bottleneck 10 in the vacuum space 4, which include the surface of the joint 3. The at least one metal deposit 20 may be one or more nickel layers deposited by electroplating and/or electroless plating. A copper or silver layer may further be deposited on the outermost nickel layer to improve the thermal insulating properties of the bottle. In the embodiment illustrated in FIGS. 1 and 2, the deposit 20 consists of a nickel deposit 7 a copper or silver deposit 8, and the nickel deposit 7 being composed of a strike nickel layer 7a, a semibright nickel layer 7b, a trinickel layer 7c and a bright nickel layer 7d.

The thermos bottle with the construction as above described may be produced, for example, in the following manner. A stainless steel sheet is formed into a barrel 1a, a bottom member 1b and a shoulder member 1c, which are then joined together by welding or soldering to form a substantially cylindrical inner bottle 1 with a narrow neck 10a. Also, there are prepared three components for the outer bottle 2, i.e., a barrel 2a, a bottom member 2b and a shoulder member 2c. The shoulder member 2c is then incorporated to the barrel 2a. In this embodiment the inner and outer bottles 1 and 2 are composed or three divided components, but they may be composed of two or four components. For example, the inner bottle may be composed of a closed-end barrel 1a and a shoulder member 1c. The thus prepared inner bottle 1 is masked at an upper half of the outer surface 11 of the neck portion 10a by a suitable masking material such as a rubber cap, a masking shield tape, etc., and then plated to form the deposit 20 on its outer surface except for a part of the outer surface 11 of the neck portion. The plating can be carried out in the conventional manner, using a known plating solution. For example, the inner bottle is cleaned by degreasing, water-washing, and picking of its surface to be plated, and then immersed into an electroless nickel plating solution to form a preliminary thin nickel deposit 7a as a strike. The inner bottle is then electroplated, and a semibright nickel deposit 7b, trinickel deposit 7c and a bright nickel deposit 7d are formed in turn on the strike. After the nickel is plated out on the outer surface of the inner bottle, a copper or silver is deposited on the nickel deposit 7. The masking material is removed from the inner bottle, and the bottle 1 is then joined at the tip of its neck portion 10a with the united barrel-shoulder member with which the bottom member 2b is joined, to form a double-walled construction. The thus prepared thermos bottle 100 is evacuated to a vacuum of about $10^{-3}$ to $10^{-4}$ Torr by known mechanical pumps. During this process the bottle 100 is heated to remove absorbed or adsorbed gases from its surfaces. The thermos bottle is then sealed off by closing the tip tube 5, and the bottom cap 6 is fixed to the bottom member 2b to complete the thermos bottle as shown in FIG. 1.

In the stainless steel thermos bottle according to the present invention, the outermost metal deposit, particularly, the copper or silver deposit, as well as the silver mirror surface in the glass thermos bottle, prevents heat transfer due to radiation. Also, the surfaces 11 and 12 of the bottleneck 10 including the joint surface in the vacuum space is not plated, so that heat transfer due to conduction is not increased and removal of the copper or silver deposit from the tip ends of the neck portions to be welded, which causes welding defects, is not required. In addition, the nickel deposits prevent the liberation of gas from the interior of the basis metal (i.e., stainless steel), so that there is almost no lowering of the vacuum. Even if the gas is released from the basis metal through the nickel deposits, the liberation of the gas into the vacuum is prevented by the copper or silver deposit. If desired, a getter material may be placed in the vacuum. Accordingly, the thermos bottle according to the present invention possesses high thermal insulating properties and maintains these properties constant for a long time.

EXAMPLE 1

Using a stainless steel sheet with a 0.5 mm thickness, there are prepared an inner barrel 1a integrated with a shoulder member 1c, and a bottom member 1b, which are then welded to complete an inner bottle 1. Using a stainless steel sheet with a 0.6 mm thickness, there are prepared an outer barrel 2a, a bottom member 2b and a shoulder member 2c. The shoulder member 2c is then incorporated as an integral part of the barrel 2a by welding. The outer surface of the inner bottle 1 and the inner surfaces of the outer bottle members 2a, 2b and 2c are polished by buffing, and the inner bottle 1 and the outer bottle members 2a, 2b, 2c are masked with masking tapes on their respective surfaces, including upper half of the surfaces 11 and 12 of their neck portions, which are not to be plated.

The inner bottle 1 and the outer bottle members (2a, 2b, 2c) are cleaned in the conventional manner, pickled in an acid solution containing 50 g/l of chloric acid for 40 to 50 seconds at ordinary temperature, and then electroplated in a plating solution containing 90 g/l of chloric acid for 40 seconds under the conditions of a temperature of 30° to 40° C. and a current density of 2 A/dm$^2$, to form a strike nickel deposit 7a. After washing, electroplating is carried out in turn, using respective solutions and conditions described below to form a 7 to 8μ thick semibright nickel deposit 7b, a 1μ thick trinickel deposit 7c and a 7 to 8μ thick bright nickel deposit 7d. Each time the plating is finished, washing is carred out.

Composition and conditions for semibright nickel plating (Ingredients)
  Nickel sulphate: 300 g/l
  Nickel chloride: 50 g/l
  Boric acid: 45 g/l
  Semibrightener (Semibright Nickel N: UDYLTE Co., Ltd): 1.2 ml/l
  Semibrightener (Semibright Nickel GS: UDYLTE Co., Ltd): 0.5 ml/l
(Conditions)
  Temp.: 50° C.
  Current density: 3 A/dm$^2$
  Time: 1050 seconds Composition and conditions for trinickel plating (Ingredients)
  Nickel sulphate: 300 g/l
  Nickel chloride: 80 g/l
  Boric acid: 40 g/l
  Rust preventive (trilite: UDYLTE Co., Ltd): 25 ml/l
(Conditions)
  Temp.: 50° C.
  Current density: 3 A/dm$^2$
  Time: 114 seconds Composition and conditions for bright nickel plating (Ingredients)
  Nickel sulphate: 300 g/l
  Nickel chloride: 50 g/l
  Boric acid: 45 g/l
  Brightener (Nickel Brightener #61: (UDYLTE (Co., Ltd): 15 ml/l
  Brightener (Nickel Brightener #63: UDYLTE Co., Ltd): 5 ml/l
(Conditions)
  Temp: 50° C.
  Current density: 3 A/dm$^2$
  Time: 906 seconds After the desired nickel deposits are formed on the outer surface of the inner bottle and the inner surfaces of the outer bottle members 2a, 2b and 2c, a copper plating is carried out by using a water solution containing 200 g/l of copper sulphate, 50 g/l of sulphuric acid and a known brightener, at 25° C. for 3 minutes with a current density of 2 to 3 A/dm$^2$ to form a 3 to 5μ thick copper deposit on the nickel deposit.

The inner bottle 1 is seam-welded at its tip 3 with the tip of the shoulder member 2c incorporated with the outer bottle barrel 2a, and the bottom member 2b is welded to the lower end of the barrel 2a, to provide a double-walled construction. The wall surfaces of the inner and outer bottles, which surround the space 4 between two bottles, are cleaned by degreasing and washing. The thermos bottle is evacuated through the tip tube 5 and then sealed off by closing the tip tube 5. A bottom cap 6 is fixed to the bottom of the outer bottle by a suitable binder to complete the thermos bottle with a capacity of 0.75 liter as shown in FIG. 1. The inner surface of the inner bottle 1 is electropolished, and the outer surface of the outer bottle 2 is buffed.

EXAMPLE 2

A stainless steel thermos container is prepared in the same manner as in Example 1, except that a silver plating is carried out instead of the copper plating, using a silver plating bath containing 1.5 g/l of silver cyanide and 60 g/l of potassium cyanide and under the conditions of a temperature of 20° to 30° C. and a current density of 2 to 3 A/dm$^2$ for 90 seconds, to form a 3 to 5μ thick silver deposit.

COMPARATIVE EXAMPLE 1

A stainless steel thermos container is prepared in the same manner as in Example 2, except that the whole of the outer surface of the inner bottle and the inner surfaces of the outer bottle members are plated without masking, and that the nickel and silver deposits formed on the tips of the inner bottle and shoulder member 2c are removed before welding.

For the thus prepared thermos bottles with a capacity of 0.75 liter, the heat-retaining performance is measured by the test method defined by JIS-S2005. In this test method, the thermos bottle is filled with 0.75 liter of hot water, of which a temperature is 95° C., stoppered and then allowed to stand for 24 hours at 20° C. After this, the temperature of the hot water is measured.

The first results for the thermos bottles of Examples 1 and 2 are 56.0° C. and 56.5° C., respectively. The results after the test was repeated for 40 days are 56.0° C. and 56.5° C., respectively. The first result for the thermos bottle of the Comparative Example is 54.4° C.

and the result after the test was repeated for 20 days is also 54.4° C.

As can be seen from these results, the thermos bottle of the Comparative Example, in which the wall surfaces that surround the vacuum space are completely plated, exhibits a maintenance of the heat-retaining performance as good as that exhibited by the bottles of Examples 1 and 2, but its level of heat-retaining performance is lower than that of the thermos bottle of Example 2 by 2 degrees.

EXAMPLE 3

A stainless steel thermos bottle of FIG. 1 is prepared in the same manner as in Example 2, except that the nickel and silver deposits are formed only on the outer surface of the inner bottle except for the outer surface 11 of its neck portion. The first result of the heat-retaining performance is 55.5° C., and the result after 20 days is also 55.5° C.

COMPARATIVE EXAMPLE 2

A stainless steel thermos bottle with a capacity of 0.75 liter is prepared in the same manner as in Example 1, except that nickel and silver plating is not carried out. The first result of the heat-retaining performance test is 45° C. and the result after the test was repeated for 30 days is 43° C.

EXAMPLE 4

A stainless steel thermos bottle with a capacity of 0.90 liter is prepared in the same manner as in Example 1. The first result of the heat-retaining performance test is 60.5° C., and the result after 30 times is 60.5° C.

EXAMPLE 5

A stainless steel thermos bottle with a capacity of 0.90 liter is prepared in the same manner as in Example 2. The first result of the heat-retaining performance test is 61.0° C., and the result after 30 times is 61.0° C.

EXAMPLE 6

A stainless steel thermos bottle with a capacity of 0.90 liter is prepared in the same manner as in Example 3. The first result of the heat-retaining performance test is 60.0° C., and the result after 30 times is 60.0° C.

COMPARATIVE EXAMPLE 3

A stainless steel thermos bottle with a capacity of 0.90 liter is prepared in the same manner as in Comparative Example 1. The first result of the heat-retaining performance test is 58.5° C., and the result after 30 times is 58.5° C.

COMPARATIVE EXAMPLE 4

A stainless steel thermos bottle with a capacity of 0.90 liter is prepared in the same manner as in Comparative Example 2. The first result of the test is 49.0° C., and the result after 30 times is 47.0° C.

As can be seen from the above, the thermos bottle according to the present invention is much improved in the areas of thermal insulating properties and stability of heat-retaining performance. In addition, there is no need to place bright metal plates laminated with glass wool or fine grained particles in the vacuum space, so that it is possible to produce a more compact metal thermos bottle.

What we claim is:

1. A stainless steel thermos bottle comprising inner and outer bottles made of stainless steel, each of said bottles having inner and outer surfaces, said inner and outer bottles being joined together at tip portions of their bottle necks to form a double-walled construction with a space therebetween, said thermos bottle having a vacuum present in the space created between the inner and outer bottles, said thermos bottle being characterized in that the surfaces of the inner and outer bottles surrounding said space are provided with a metal deposit on at least the outer surface of the inner bottle, except for that portion of the bottle neck surfaces in the area which includes the surface of the joint between the two bottles, said metal deposit comprising, in order of deposition, a strike nickel layer, a semi-bright nickel layer, a tri-nickel layer, a bright nickel layer, and an outer layer selected from the group consisting of silver and copper.

2. The stainless steel thermos bottle according to claim 1, wherein said semi-bright nickel layer, said tri-nickel layer, and said bright nickel layer have thicknesses of approximately 7 to 8µ, 1µ, and 7 to 8µ, respectively.

* * * * *